United States Patent [19]
Maeda et al.

[11] Patent Number: 5,527,870
[45] Date of Patent: Jun. 18, 1996

[54] PROCESS FOR THE PREPARATION OF ISOBUTYLENE POLYMER

[75] Inventors: Takuya Maeda; Hideo Kawachi; Masanobu Tamura; Shun Wachi, all of Hyogo, Japan

[73] Assignee: Kanagafuchi Kagaku Kogyo Kabushiki Kaisha, Osaka, Japan

[21] Appl. No.: 370,386

[22] Filed: Jan. 10, 1995

[30] Foreign Application Priority Data

Jan. 12, 1994 [JP] Japan .................................... 6-013068
Jun. 9, 1994 [JP] Japan .................................... 6-150646

[51] Int. Cl.$^6$ .................................................. C08F 10/10
[52] U.S. Cl. .................. 526/348.7; 526/89; 526/204; 526/215; 526/216; 526/217; 526/222; 526/236; 526/279; 526/339; 526/135
[58] Field of Search ................................ 526/348.7, 339, 526/279

[56] References Cited

U.S. PATENT DOCUMENTS

| | | | |
|---|---|---|---|
| 4,276,394 | 6/1981 | Kennedy | 525/245 |
| 4,327,201 | 4/1982 | Kennedy | 526/131 |
| 5,169,914 | 12/1992 | Kaszas | 526/135 |
| 5,408,018 | 4/1995 | Rath | 526/237 |

*Primary Examiner*—Fred Zitomer
*Attorney, Agent, or Firm*—Armstrong, Westerman, Hattori, McLeland & Naughton

[57] ABSTRACT

An isobutylene is polymerized in the presence of an aromatic initiator and a catalyst under the conditions that either a chlorinated hydrocarbon or an aromatic hydrocarbon is used singly or in admixture with an aliphatic hydrocarbon so that the reaction solution has a dielectric constant of 1 to 5 and a solubility parameter of 7.5 to 9.0.

8 Claims, No Drawings

PROCESS FOR THE PREPARATION OF ISOBUTYLENE POLYMER

FIELD OF THE INVENTION

The present invention relates to the preparation of an isobutylene polymer. More particularly, the present invention relates to a process for the preparation of an isobutylene polymer in the presence of an initiator. Materials made of such a polymer as a starting material can be used as coating materials, building sealants, electronic material sealants, etc. by making the best use of its excellent properties such as high viscoelasticity, weathering resistance and gas barrier properties.

BACKGROUND OF THE INVENTION

It has been known that the polymerization reaction of isobutylene involves cationic polymerization. A polymerization method which begins with a protonic acid in the presence of a Lewis acid catalyst has been developed. As a method for efficiently effecting initiation reaction for polymerization there has been developed Inifer method which comprises the use of 1,4-bis(α-chloroisopropyl)benzene (p-dicumyl chloride (abbreviated as DCC)) terminated by chlorine connected to tertiary carbon or the like as a polymerization initiator (as disclosed in U.S. Pat. No. 4,276,394). It is considered that an aromatic compound terminated by chlorinated tertiary carbon is desirable for the formation of a highly active cation in the polymerization initiation point. In the Inifer method, the polymerization degree of product can be controlled by selecting the ratio of the initiator and the isobutylene monomer, making it possible to provide a molecular weight necessary for the accomplishment of physical properties depending on the purpose. In the polymerization reaction under the conditions of high reaction temperature, the growing reaction involves a chain transfer reaction that causes a rise in the number of polymers, occasionally making it difficult to predetermine a molecular weight. However, at temperatures as low as $-100°$ C. to $-30°$ C., a reactivity close to living polymerization is exhibited, inhibiting chain transfer reaction. This allows the number of polymers to be predetermined by the initiator.

One of the problems of the prior art Inifer method is a drop of the initiator efficiency due to indanylation as a side reaction caused by the use of p-DCC as an initiator. The molecular weight of the polymer as a product varies with the drop of the amount of the initiator due to the side reaction. Another problem is the widening of the distribution of the molecular weight of the polymer which affects the physical properties thereof. In order to solve these problems, a method has been proposed which comprises the use of additives such as electron donor (as disclosed in JP-A-2-245004 (The term "JP-A" as used herein means an "unexamined published Japanese patent application"), JP-A-1-318014, JP-A-3-174403).

In order to put an isobutylene polymer into practical use as a practical material, the isobutylene polymer can be cured by introducing a reactive functional group into molecule or terminal thereof to effect vulcanization or crosslinking. In particular, a use of a bifunctional initiator such as p-DCC causes both ends of the polymer chain to be terminated by chlorinated tertiary carbon to provide a sufficient reactivity. The resulting product is useful as a crosslinked polyisobutylene rubber. Such a polymer having a reactive functional group introduced into the terminals thereof is known as a telechelic polymer. In order to introduce vinyl group into the ends of the polymer, a method has been developed which comprises adding a non-conjugated diene represented by formula $CH_3=CH(CH_2)_nCH=CH_2$ (JP-A-4-103606). In this case, a use of 1,9-decadiene is disadvantageous in that it involves a side reaction to produce a low molecular compound at the same time with the introduction of vinyl group into the ends of the polymer. Such a low molecular impurity has a high content of vinyl group derived from decadiene. Therefore, even a small amount of such a low molecular impurity can cause a rise in the crosslinking density that has a great effect on the physical properties of the product.

As a method for introducing vinyl group into a polymer there is also known as a method which comprises the use of an allyltrimethyl silane.

The problems with the production of a telechelic polymer by utilizing the Inifer method for a living cationic polymerization of isobutylene involve the close relation of the conditions of the chemical reaction. In the cationic polymerization, it is important that carbocations are stably produced at the growth ends. The higher the dielectric constant of the reaction solvent is, the greater the rate of cationic polymerization becomes. A method has been known which comprises the use of a halogenated hydrocarbon such as dichloromethane or compound containing nitro group (as disclosed in JP-A-63-205304, JP-A-63-205305). As the method for effecting a polymerization reaction with a hydrocarbon solvent a method which comprises the use of hexane, pentane, butane, propane or the like has been known (JP-B-5-32409 (The term "JP-B" as used herein means an "examined Japanese patent publication")).

The isobutylene polymerization with a halogenated hydrocarbon solvent proceeds at a relatively high rate and generates a polymerization heat of about 13 kcal/mol. Under the conditions that the polymerization reaction is completed in a period of time as short as about 1 to 10 minutes, the polymerization reaction rapidly generates a heat. In particular, when the polymer is produced on a large scale, a problem arises how to remove the reaction heat and control the temperature.

One of the causes of the distribution of molecular weight of the polymer is considered to have something to do with the ratio of the initiation reaction to growth reaction. Indanylation reaction is considered to have something to do with the reactivity in which the growth ends attack an aromatic ring in the initiator itself. The side reaction derived from decadiene is considered to have a mechanism similar to cationic polymerization.

The cationic polymerization is effected at a relatively low temperature. Thus, the resulting polymer is occasionally deposited in a form of gel or solid. The deposit is liable to be attached to the reaction vessel, giving difficulty in operation. At the same time, an introduction of the functional group into the ends of the polymer must be effected by a solid-liquid phase reaction that can lower the reaction rate. In this respect, a proper reaction solvent in which the resulting polymer can be solved is preferably selected.

SUMMARY OF THE INVENTION

The present invention is to provide a process for the efficient preparation of an isobutylene polymer having a uniform molecular weight by controlling the rate of synthesis reaction of isobutylene polymer while inhibiting side reactions to control the molecular weight, make the efficient use of an initiator and reduce the amount of by-products.

In order to solve the problems with the production of an isobutylene polymer, the inventors have made extensive studies of various factors governing the reaction. As a result, the inventors have found proper reaction conditions and thus worked out the present invention. The present invention is to provide a process for the preparation of an isobutylene polymer which comprises the polymerization of an isobutylene monomer in the presence of an aromatic initiator and a catalyst, and comprises using either a chlorinated hydrocarbon or an aromatic hydrocarbon alone or in admixture with an aliphatic hydrocarbon so that the reaction solution has an initial dielectric constant of 1 to 5 and a solubility parameter of 7.5 to 9.0.

DETAILED DESCRIPTION OF THE INVENTION

In the present invention, a polymerization initiator is present in the reaction system. The polymerization initiator comprises a compound having tertiary carbon connected to its aromatic group. Preferably, the tertiary carbon has halogen, ether or ester connected thereto. For example, p-DCC (dicumyl chloride), tricumyl chloride, etc. may be used. The amount of the initiator used may be such that the proportion of isobutylene monomer is from 500 to 500,000 based on 1 mol of initiator depending on the molecular weight of the polymer to be produced. For example, if a polymer having a molecular weight of about 10,000 is produced, the proportion of isobutylene may be 10,000 g per mol of initiator.

As the catalyst a Lewis acid such as $TiCl_4$, $AlCl_3$, $BCl_3$, $ZnCl_2$, $SnCl_4$, ethyl aluminum chloride ($C_2H_5AlCl_2$) and $SnBr_4$ may be used. The amount of the catalyst to be used may range from 0.0001 to 10 mol per mol of the polymerization initiator used. It may also range from 0.0001 to 10 mol per mol of the isobutylene monomer.

As an electron donor, pyridine, 2-methylpyridine (abbreviated as picoline), trimethylamine, dimethylacetamide (abbreviated as DMAc), DMSO, EtOAc or the like may be added into the reaction system in advance. The added amount of the electron donor, if any, is preferably less than the catalyst and may range from 0.01 to 10 mol per mol of the polymerization initiator.

A reaction temperature may range from $-100°$ C. to $0°$ C. A relatively high temperature condition gives a low reaction rate and causes side reactions such as chain transfer reaction. Therefore, a temperature lower than $-30°$ C. is preferably selected. Under low temperature conditions, a solubility of the polymer is lowered, causing the polymer to be deposited. Thus, the reaction temperature preferably range from $-70°$ C. to $-30°$ C.

A main feature of the present invention is reaction solvent comprised of chlorinated hydrocarbon or aromatic hydrocarbon alone or in admixture with aliphatic hydrocarbon so that the dielectric constant and solubility parameter of the reaction solution at a room temperature are from 1 to 5 and from 7.5 to 9.0, respectively at least on starting the reaction. The solubility parameter is obtained by J. H. Hildebrand, R. L. Scott, "The Solubility of Non-Electrolytes" published by Dover Publication Inc., New York, N.Y., 1964.

As the chlorinated hydrocarbon there may be used dichloromethane, methane chloride, dichloroethane, propane chloride, butane chloride or the like. As the aromatic hydrocarbon there may be used benzene, toluene, biphenyl, xylene, ethylbenzene or the like. As the aliphatic hydrocarbon there may be used octane, ethylcyclohexane, heptane, hexane, pentane, butane, propane or the like.

The chlorinated hydrocarbon exhibits a high dielectric constant and a high solubility parameter. For example, dichloromethane exhibits a dielectric constant of 7.7 and a solubility parameter of 9.7 at a room temperature and thus can attain a predetermined dielectric constant and solubility parameter when mixed with an aliphatic hydrocarbon such as hexane. An aromatic hydrocarbon exhibits a moderate dielectric constant and a high solubility parameter and thus can attain predetermined dielectric constant and solubility parameter when mixed with a less amount of an aliphatic hydrocarbon than used with chlorinated hydrocarbon. For instance, a solvent mixture composed of dichloromethane and hexane in a volume proportion of 2:8 to 5:5 shows a dielectric constant of 2.99 to 4.73, and a solubility parameter of 7.78 to 8.47, and a solvent mixture composed of toluene and hexane in a volume proportion of 9:1 to 6:4 shows a dielectric constant of 2.2 to 2.06 and solubility parameter of 8.74 to 8.26.

A method which comprises the use of a chlorinated hydrocarbon as a reactive solvent has heretofore been well known. Another method has been known which further comprises an addition of a small amount hexane. However, the dielectric constant of the reactive solvent is limited to higher than 5. Thus, this method puts emphasis on the reaction activity of cationic polymerization.

The present invention focuses on a proper solvent composition based on novel findings that a polymer having a more uniform distribution of molecular weight can be obtained by suppressing the rate of polymerization reaction at a lower dielectric constant condition.

On the other hand, regardless of the fact that toluene exhibits a dielectric constant of 2.2 at $20°$ C., which is far lower than that of dichloromethane, and no methods for polymerizing isobutylene have been known which comprises the use of toluene as a reactive solvent, it has been found that the polymerization of isobutylene can be fairly carried out with toluene at a reaction temperature of $-60°$ C. to $-30°$ C. Further, toluene can be used in admixture with an aliphatic hydrocarbon. As the aliphatic hydrocarbon there may be used octane, heptane, hexane, pentane, butane, propane or the like. The principal purpose in mixing toluene with an aliphatic hydrocarbon is to dissolve the polymer which would be deposited at a temperature of not higher than $-50°$ C. if toluene alone is used. If the reaction is effected with an aliphatic hydrocarbon alone, a chain transfer reaction is dominant, making it impossible to obtain a desired polymer. This is the reason why the various solvents are mixed in the foregoing proportions.

A amount of the isobutylene monomer to be charged into the reactive solvent is not more than 15 mol/l. When the isobutylene monomer concentration is high, the polymer is deposited. If the charged amount of isobutylene is low, a productivity is reduced. Thus, the charged amount of isobutylene is preferably from 1 to 50 wt. %. More preferably, the charged amount of isobutylene is from 5 to 30 wt. % so that the resulting polymer can be handed in a form of solution. Other cationically polymerizable monomers may be added to effect copolymerization to produce an isobutylene polymer of the present invention. Examples of these cationically polymerizable monomers include aliphatic olefins such as 2-butylene, 2-methyl-1-butylene, 3-methyl-2-butylene, pentene, hexene, cyclohexene, vinylcyclohexene, 5-ethylidenenorbornene, indene and β-pinene, dienes such as cyclopentadiene and dicyclopentadiene, and styrenes such as α-methylstyrene and p-chlorostyrene. Such a cationically polymerizable monomer may be used in an amount of not more than 50% by weight based on the weight of isobutylene monomer.

The isobutylene polymer may be terminated by chlorine connected to tertiary carbon. Other functional groups may be introduced into the ends of the polymer to allow the polymer to exhibit functions depending on the purpose. Examples of the reactive functional groups to be introduced into the ends of the polymer include allyl group, hydroxyl group, allylphenylether group, and phenol group. The formation of such a terminal group may be accomplished as follows. For example, Friedel-Crafts reaction may be effected to connect phenol to the ends of the polymer. Alternatively, a substitution reaction with an allyl silane may be effected to allow the polymer to be terminated by vinyl group. Further, a diene group represented by formula $CH_2=CH(CH_2)_nCH=CH_2$ (the hydrogen atoms in $(CH_2)_n$ may be substituted by alkyl group, preferably methyl group or the like). A suffix n preferably represents an integer 1 to 30. Particularly preferred examples of the diene represented by the foregoing formula include 1,5-hexadiene, 1,7-octadiene, 1,9-decadiene, 1,11-dodecadiene, 3-methyl-1,7-octadiene, 4-methyl-1,9-decadiene, and 5-methyl-1,9-decadiene) may be additionally connected to the polymer to allow the polymer to be terminated by vinyl group.

Such a compound containing functional groups may be used in an amount of not more than 100 mol per mol of isobutylene polymer used.

The reaction conditions of the present invention provide an effect of giving a uniform distribution of molecular weight of the polymer. For example, if dichloromethane alone is used as a reactive solvent, the rate of a polymerization growth is high while initiation reaction takes relatively long period of time. Therefore, this possibly gives a great difference between the polymer produced by the growth over a long period of time from the initiation of the reaction and the polymer having a lower molecular weight due to the retarded initiation of the reaction, resulting in a wide distribution of molecular weight. On the contrary, if dichloromethane is used in admixture with hexane or toluene is used as a reactive solvent, the growth reaction rate is low, making it possible to complete the initiation reaction in the initial stage. This possibly makes the polymer molecules to grow equally, providing a uniform distribution of molecular weight.

In accordance with the method of the present invention, the polymerization reaction rate becomes low, reducing the rate of heat generation caused by the polymerization. Accordingly, the control over the reaction temperature by heat removal and cooling is relatively easy.

If p-DCC is used an initiator, the indanylation reaction of aromatic group can occur, reducing the efficiency of initiator and making it difficult to predetermine the molecular weight of the polymer. The use of the conditions of reactive solvent of the present invention provides a remarkable inhibition of indanylation as a side reaction.

When dienes such as decadiene and octadiene are additionally reacted to introduce vinyl group as a reactive functional group into the ends of the polymer, side reactions derived from these dienes can occur to produce impurities. The use of the conditions of reactive solvent of the present invention provides a remarkable inhibition of the production of impurities.

The present invention will be further described in the following specific examples, which are not to be construed as limiting the scope thereof.

EXAMPLE 1

Into a reaction vessel were charged 276 ml of toluene, 28 ml of an isobutylene monomer, 289 g of p-DCC and 0.047 g of picoline. A dielectric constant and a solubility parameter of toluene were 2.24 and 8.90, respectively. The mixture was then stirred while the reaction vessel being in a dry ice-ethanol bath so that it was cooled to a temperature of −70° C. A mixture of 3.95 ml of $TiCl_4$ and 4 ml of toluene was poured into the reaction vessel to initiate the reaction. After the completion of the reaction, the reaction solution was poured into a large amount of water with stirring so that it was washed. The resulting organic phase and aqueous phase were then separated from each other to remove the catalyst. The organic phase was then subjected to evaporation to remove the volatile component therefrom. Thus, a polymer product was obtained. The polymer product thus obtained was then subjected to GPC analysis to determine its molecular weight and distribution thereof. The results were as follows:

Number-average molecular weight (Mn): 14,636

Mw/Mn: 1.12

Results of NMR analysis:

The proportion of indanylation of aromatic rings in p-DCC (Fn (indanyl)) was 0.17.

EXAMPLE 2

Into the reaction vessel were charged 112 ml of an isobutylene monomer, 1.156 g of p-DCC and 0.186 g of picoline. The other conditions were the same as in Example 1. A solution of 3.95 ml of a catalyst in 4 ml of toluene was then poured into the reaction vessel to effect the reaction. Thus, a polymer product was obtained.

The polymer product was subjected to GPC analysis to determine its molecular weight and distribution thereof. The results were as follows:

Number-average molecular weight (Mn): 15,987

Mw/Mn: 1.13

Results of NMR analysis:

The proportion of indanylation of aromatic rings in p-DCC (Fn (indanyl)) was 0.16.

EXAMPLE 3

A polymerization reaction was effected in the same manner as in Example 1 except that the reaction temperature was −50° C. After the completion of the polymerization reaction, 9.95 g of decadiene was added to introduce a functional group in the polymer.

The polymer product was subjected to GPC analysis to determine its molecular weight and distribution thereof. The results were as follows:

Number-average molecular weight Mn: 14,312

Mw/Mn: 1.2

No low molecular by-products were detected.

Results of NMR analysis:

The proportion of indanylation of aromatic rings in p-DCC (Fn (indanyl)) was 0.18.

EXAMPLE 4

A polymerization reaction was effected in the same manner as in Example 1 except that 248 ml of toluene and 28 ml of hexane were charged into the reaction vessel. A dielectric constant and a solubility parameter of a solvent mixture comprising toluene and hexane were 2.20 and 8.74, respectively.

The resulting polymer product was then subjected to GPC analysis to determine its molecular weight and distribution thereof. The results were as follows:

Number-average molecular weight (Mn): 16,084

Mw/Mn: 1.10

The proportion of indanylation of aromatic rings in p-DCC (Fn (indanyl)) was 0.14.

EXAMPLE 5

Into the reaction vessel were charged 76 ml of dichloromethane, 196 ml of hexane, 28 ml of an isobutylene monomer, 0.289 g of p-DCC and 0.047 g of picoline. A dielectric constant and solubility parameter of a solvent mixture comprising dichloromethane and hexane were 3.59 and 8.02, respectively. The mixture was then stirred while the reaction vessel being in a dry ice-ethanol bath so that it was cooled to a temperature of $-70°$ C. A mixture of 3.95 ml of $TiCl_4$ and 8 ml of dichloromethane was then poured into the reaction vessel to initiate the reaction. After the completion of the reaction, the reaction solution was poured into a large amount of water with stirring so that it was washed. The resulting organic phase and aqueous phase were then separated from each other to remove the catalyst. The organic phase was then subjected to evaporation to remove the volatile component therefrom. Thus, a polymer product was obtained. The polymer product thus obtained was subjected to GPC analysis to determine its molecular weight and distribution thereof. The results were as follows:

Number-average molecular weight (Mn): 18,549

MW/Mn: 1.07

Results of NMR analysis:

The proportion of indanylation of aromatic rings in p-DCC (Fn (indanyl)) was 0.

EXAMPLE 6

A polymerization reaction was effected in the same manner as in Example 5 except that 56 ml of dichloromethane and 216 ml of hexane were charged into the reaction vessel. A dielectric constant and solubility parameter of a solvent mixture comprising dichloromethane and hexane were 2.99 and 7.78, respectively. Thus, a polymer product was obtained.

The polymer product thus obtained was then subjected to GPC analysis to determine its molecular weight and distribution thereof. The results were as follows:

Number-average molecular weight (Mn): 15,802

Mw/Mn: 1.08

Results of NMR analysis:

The proportion of indanylation of aromatic rings in p-DCC (Fn (indanyl)) was 0.

EXAMPLE 7

A polymerization reaction was effected in the same manner as in Example 5 except that 104 ml of dichloromethane and 168 ml of hexane were charged into the reaction vessel. A dielectric constant and solubility parameter of a solvent mixture comprising dichloromethane and hexane were 4.18 and 8.26, respectively. Thereafter, 9.95 g of decadiene was added to the reaction solution which was then allowed to undergo reaction at a temperature of $-50°$ C. to introduce a vinyl group into the polymer.

The polymer product thus obtained was then subjected to GPC analysis to determine its molecular weight and distribution thereof. The results were as follows:

Number-average molecular weight (Mn): 18,479

Mw/Mn: 1.2

Results of NMR analysis:

The proportion of indanylation of aromatic rings in p-DCC (Fn (indanyl)) was 0.

EXAMPLE 8

A polymerization reaction was effected in the same manner as in Example 7 except that 132 ml of dichloromethane and 140 ml of hexane were charged into the reaction vessel and 0.44 g of DMAc was added instead of picoline. A dielectric constant and solubility parameter of a solvent mixture comprising dichloromethane and hexane were 4.73 and 8.47, respectively.

The polymer product thus obtained was then subjected to GPC analysis to determine its molecular weight and distribution thereof. The results were as follows:

Number-average molecular weight Mn: 16,000

Mw/Mn: 1.33

Low molecular by-products were detected in a molar ratio of 0.05.

Results of NMR analysis:

The proportion of indanylation of aromatic rings in p-DCC (Fn (indanyl)) was 0.13.

EXAMPLE 9

Into the reaction vessel were charged 280 ml of toluene, 112 ml of an isobutylene monomer, 1.156 g of p-DCC and 0.186 g of picoline. A dielectric constant and solubility parameter of toluene were 2.24 and 8.90, respectively. The mixture was stirred while the reaction vessel being surrounded by a dry ice-ethanol bath so that it was cooled to a temperature of $-50°$ C. 2.74 ml of $TiCl_4$ was then poured into the reaction vessel to initiate the reaction. After the completion of the polymerization reaction, 1.71 g of trimethyl allyl silane was then added to the reaction solution to cause reaction.

After the completion of the reaction, the reaction solution was poured into a large amount of water with stirring so that it was washed. The resulting organic phase and aqueous phase were then separated from each other to remove the catalyst. The organic phase was then subjected to evaporation to remove the volatile component therefrom. Thus, a polymer product was obtained. The polymer product thus obtained was subjected to GPC analysis to determine its molecular weight and distribution thereof. The results were as follows:

Number-average molecular weight (Mn): 15,393

Mw/Mn: 1.21

Results of NMR analysis:

The proportion of indanylation of aromatic rings in p-DCC (Fn (indanyl)) was 0.

EXAMPLE 10

Into the reaction vessel were charged 196 ml of toluene, 84 ml of an isobutylene monomer, 1.156 g of p-DCC and 0.186 g of picoline. A dielectric constant and solubility parameter of a solvent mixture comprising toluene and hexane were 2.11 and 8.42, respectively. The mixture was stirred while the reaction vessel being surrounded by a dry ice-ethanol bath so that it was cooled to a temperature of $-70°$ C. 2.74 ml of $TiCl_4$ was then poured into the reaction vessel to initiate the reaction. After the reaction, the reaction solution was poured into a large amount of water with stirring so that it was washed. The resulting organic phase and aqueous phase were then separated from each other to remove the catalyst. The organic phase was then subjected to evaporation to remove the volatile component therefrom. Thus, a polymer product was obtained. The polymer product thus obtained was subjected to GPC analysis to determine its molecular weight and distribution thereof. The results were as follows:

Number-average molecular weight (Mn): 19,209
Mw/Mn: 1.2
Results of NMR analysis:
The proportion of indanylation of aromatic rings in p-DCC (Fn (indanyl)) was 0.

COMPARATIVE EXAMPLE 1

A polymerization reaction was effected in the same manner as in Example 3 except that 160 ml of dichloromethane, 112 ml of hexane and 578 g of p-DCC were charged into the reaction vessel into which a solution of a catalyst in 8 ml of methylene chloride was then poured to cause reaction. A dielectric constant and solubility parameter of a solvent mixture comprising dichloromethane and hexane were 5.38 and 8.74, respectively. Thus, a polymer product was obtained.

The polymer product thus obtained was subjected to GPC analysis to determine its molecular weight and distribution thereof. The results were as follows:

Number-average molecular weight (Mn): 9,310
Mw/Mn: 1.75
Low molecular by-products were detected in a molar ratio of 0.2 to the main product.
Results of NMR analysis:
The proportion of indanylation of aromatic rings in p-DCC (Fn (indanyl)) was 0.21.

COMPARATIVE EXAMPLE 2

A polymerization reaction was effected in the same manner as in Comparative Example 1 except that 188 ml of dichloromethane and 84 ml of hexane were charged into the reaction vessel. A dielectric constant and solubility parameter of a solvent mixture comprising dichloromethane and hexane were 5.98 and 8.98, respectively. Thus, a polymer product was obtained.

The polymer product thus obtained was then subjected to GPC analysis to determine its molecular weight and distribution thereof. The results were as follows:

Number-average molecular weight (Mn): 9,266
Mw/Mn: 1.6
Results of NMR analysis:
The proportion of indanylation of aromatic rings in p-DCC (Fn (indanyl)) was 0.26.

COMPARATIVE EXAMPLE 3

A polymerization reaction was effected in the same manner as in Example 5 except that 28 ml of dichloromethane and 244 ml of hexane were charged into the reaction vessel. A dielectric constant and solubility parameter of a solvent mixture comprising dichloromethane and hexane were 2.22 and 7.4, respectively. Thus, a polymer product was obtained.

The polymer product thus obtained was then subjected to GPC analysis to determine its molecular weight and distribution thereof. The results were as follows:

Number-average molecular weight (Mn): 2,064
Mw/Mn: 7.44
Results of NMR analysis:
The proportion of indanylation of aromatic rings in p-DCC (Fn (indanyl)) was 0.

COMPARATIVE EXAMPLE 4

A polymerization reaction was effected in the same manner as in Example 1 except that 276 ml of hexane was charged into the reaction vessel free of toluene. A dielectric constant and solubility parameter of a hexane were 1.8 and 7.3, respectively. A solution of 7.9 ml of $TiCl_4$ as a catalyst was poured into the reaction vessel to cause reaction. Thus, a polymer product was obtained.

The polymer product thus obtained was subjected to GPC analysis to determine its molecular weight and distribution thereof. The results were as follows:

Number-average molecular weight (Mn): 1,552
Mw/Mn: 7.02
Results of NMR analysis:
The proportion of indanylation of aromatic rings in p-DCC (Fn (indanyl)) was 0.87.

While the invention has been described in detail and with reference to specific embodiments thereof, it will be apparent to one skilled in the art that various changes and modifications can be made therein without departing from the spirits and scope thereof.

What is claimed is:

1. A process for the preparation of an isobutylene polymer comprising polymerizing, at a reaction temperature from −100° C. to 0° C., 1 to 50% by weight of an isobutylene monomer in a reaction solution comprising a tertiary carbon-substituted aromatic initiator a Lewis acid catalyst, and a solvent, wherein the solvent comprises either a chlorinated hydrocarbon or an aromatic hydrocarbon alone or in admixture with an aliphatic hydrocarbon, and wherein the solvent has an initial dielectric constant of 1 to 4.18 and solubility parameter of 7.5 to 9.0.

2. The process according to claim 1, wherein the polymerization reaction further comprises introducing a compound having a vinyl group into the telechelic terminal of the polymer by addition reaction or substitution reaction.

3. The process according to claim 2, wherein the initiator is 1,4-bis(α-chloroisopropyl)benzene and the compound having the vinyl group is 1,9-decadiene or allyltrimethyl silane.

4. The process according to claim 1, wherein the isobutylene monomer is charged in an amount of 5 to 30 wt. %.

5. The process according to claim 1, wherein the reaction temperature is from −60° C. to −10° C. and the solvent is toluene.

6. The process according to claim 1, wherein toluene and an aliphatic hydrocarbon are used as a solvent in a mixing proportion of 9:1 to 6:4 by volume.

7. The process according to claim 1, wherein a dichloromethane and an aliphatic hydrocarbon are used as a solvent in a mixing proportion of 2:8 to 5:5 by volume.

8. The process according to claim 1, wherein the polymerization reaction further comprises 0.01 to 10 mol of an electron donor per mol of the polymerization initiator, wherein the electron donor comprises pyridine, 2-methylpyridine, trimethylamine, dimethylacetamide, dimethylsulfoxide or ethylacetate.

* * * * *